Figure 6:
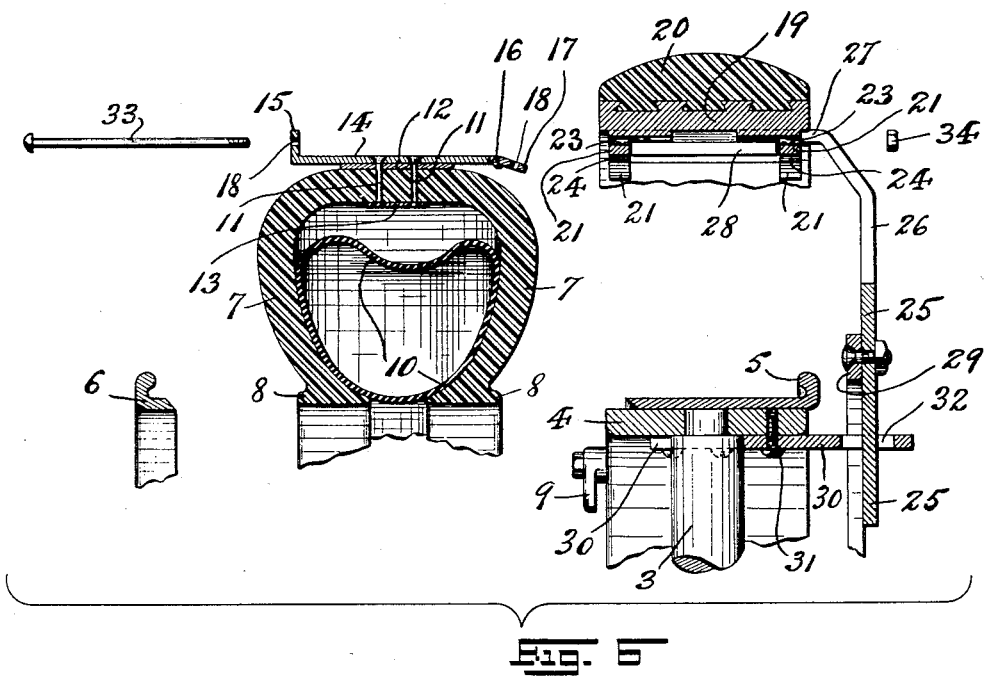

G. CONCATO.
RESILIENT TIRE FOR VEHICLE WHEELS.
APPLICATION FILED DEC. 9, 1913.
1,110,672.
Patented Sept. 15, 1914.
3 SHEETS—SHEET 1.
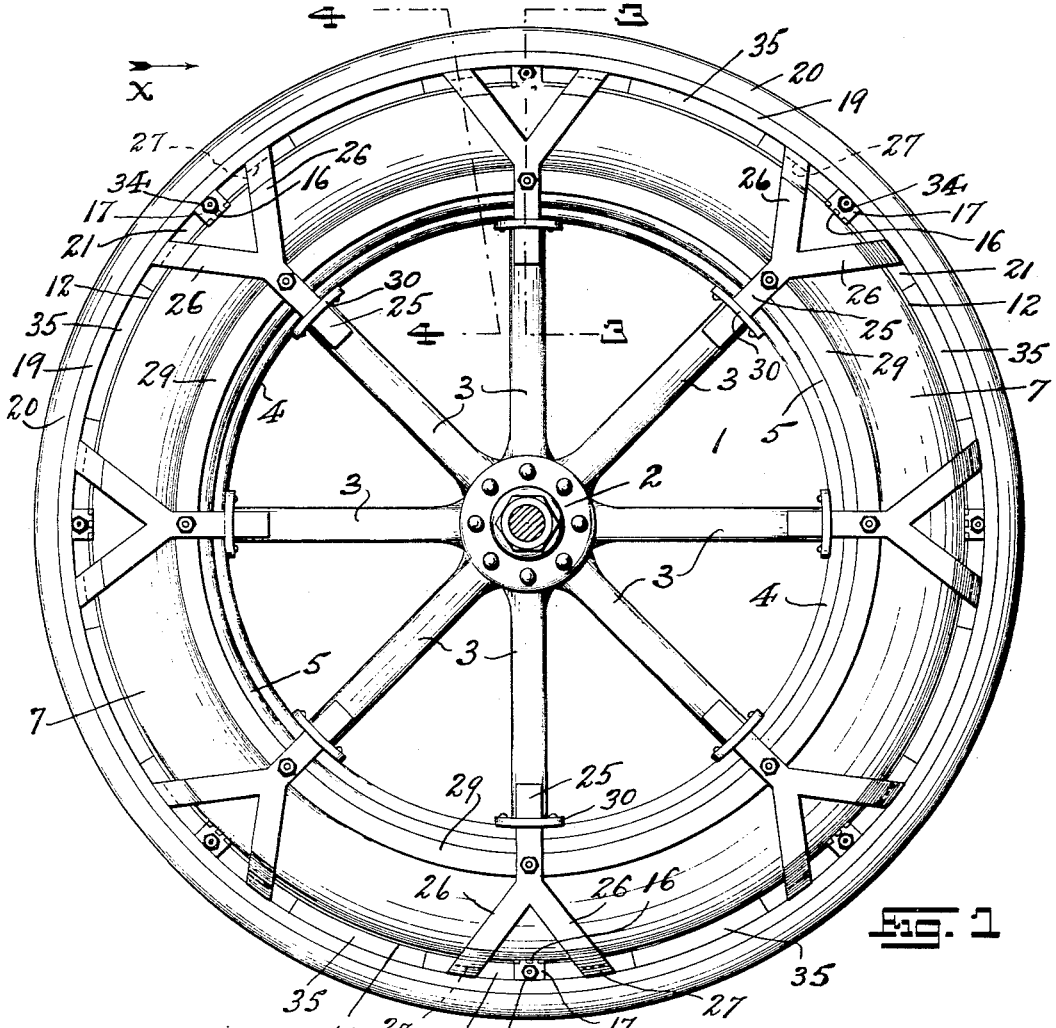
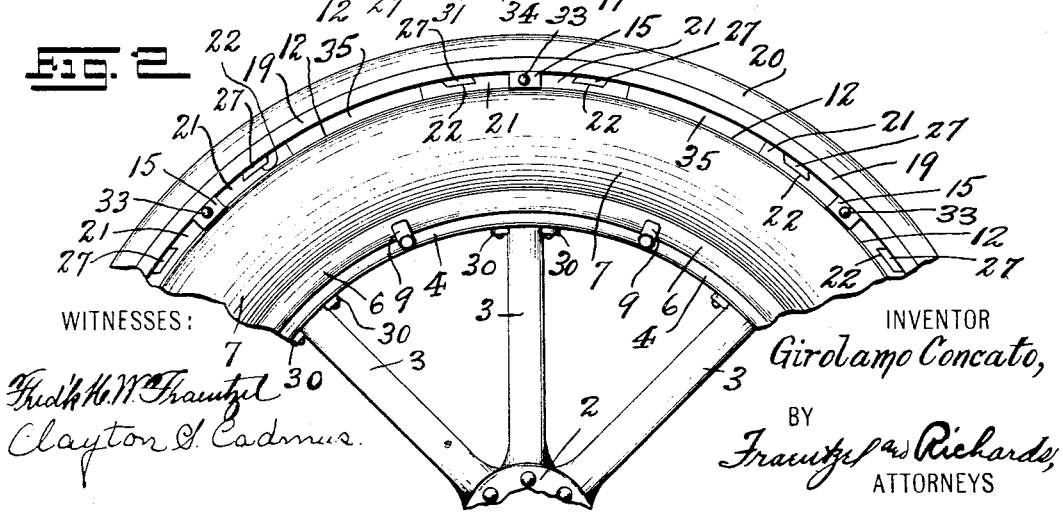
WITNESSES:
INVENTOR
Girolamo Concato,
BY
ATTORNEYS

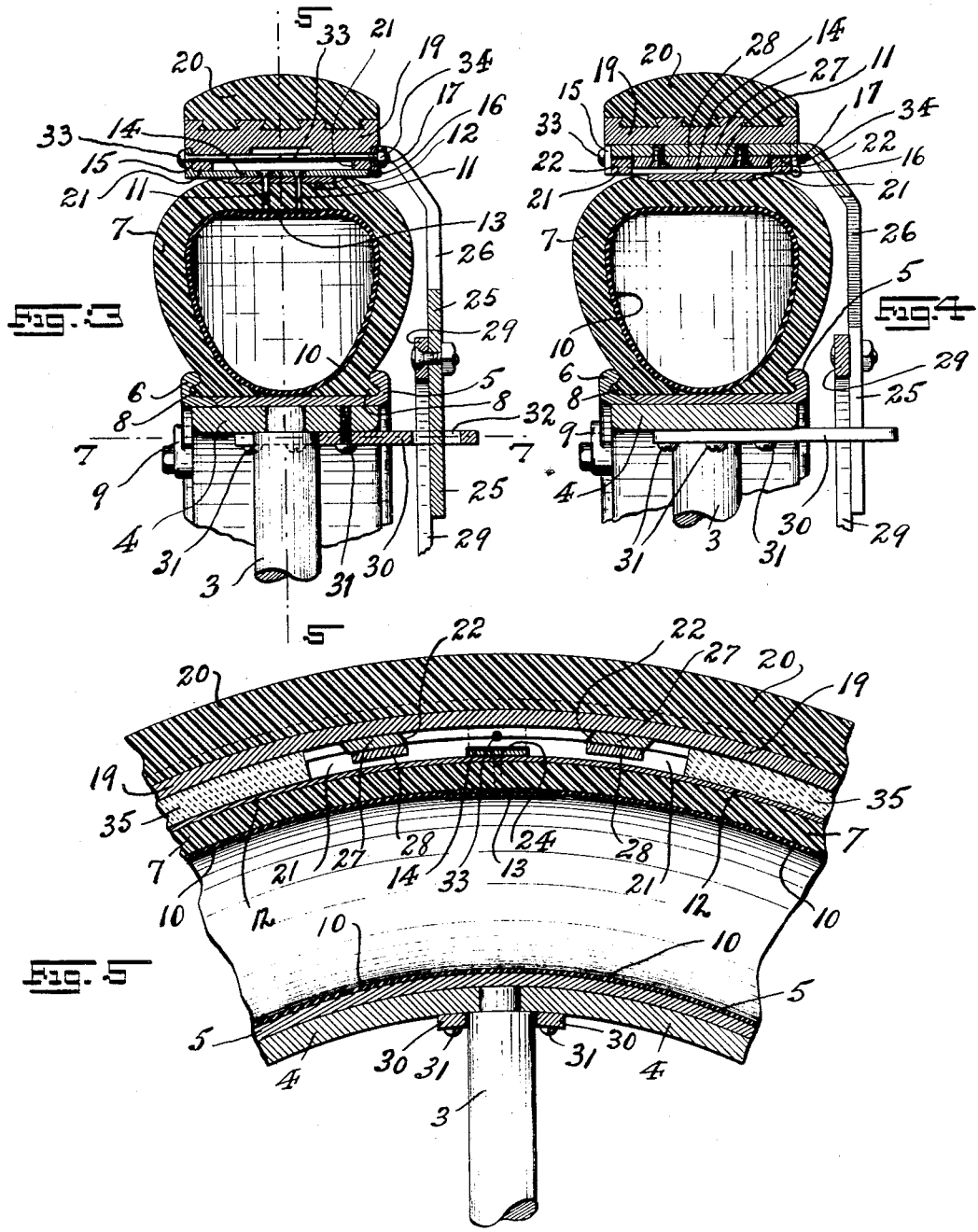

G. CONCATO.
RESILIENT TIRE FOR VEHICLE WHEELS.
APPLICATION FILED DEC. 9, 1913.

1,110,672.

Patented Sept. 15, 1914.
3 SHEETS—SHEET 3.

WITNESSES:

INVENTOR
Girolamo Concato,
BY
Frantzel and Richards,
ATTORNEYS

UNITED STATES PATENT OFFICE.

GIROLAMO CONCATO, OF PERTH AMBOY, NEW JERSEY, ASSIGNOR OF THREE-TWEN-TIETHS TO ANTHONY J. FERRETTI, OF CLIFFSIDE, NEW JERSEY, THREE-TWEN-TIETHS TO ANTHONY J. PERRONE, OF PALISADES, NEW JERSEY, AND TWO-TWENTIETHS TO CHARLES H. KAYSER, OF WEST ORANGE, NEW JERSEY.

RESILIENT TIRE FOR VEHICLE-WHEELS.

1,110,672.  Specification of Letters Patent.  Patented Sept. 15, 1914.

Application filed December 9, 1913. Serial No. 805,666.

*To all whom it may concern:*

Be it known that I, GIROLAMO CONCATO, a subject of the King of Italy, residing at Perth Amboy, in the county of Middlesex and State of New Jersey, have invented certain new and useful Improvements in Resilient Tires for Vehicle-Wheels; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in resilient tires for vehicle wheels; and the invention has reference, more particularly, to a resilient tire of the pneumatic type provided with a novel construction and arrangement of protecting tread, together with means for detachably connecting the pneumatic element of the tire both with the rim of the wheel and with said novel protecting tread.

The invention has for its principal object to provide a pneumatic tire with a novel protecting tread, which is so arranged therewith as to protect the tire from the wear of traction, and also from liability of puncture; and another object of the said invention is to provide a novel means of associating and connecting said novel tread both with the pneumatic tire or element and with the vehicle wheel itself, all in such a manner, that in the event of injury or collapse occurring in said pneumatic tire or element, the same may be detached from both the rim of the vehicle wheel and from the novel tread to permit the same to be repaired and then replaced, or to permit a new pneumatic tire or element to be substituted for the old or removed pneumatic tire or element.

Other objects of the present invention, not at this time more particularly enumerated, will be clearly understood from the following detailed description of the same.

With the various objects of the present invention in view, the same consists, primarily, in the novel construction of resilient tire for vehicle wheels hereinafter set forth; and the invention consists, furthermore, in the novel arrangements and combinations of the various devices and parts, as well as in the details of the construction of the same, all of which will be more fully described in the following specification, and then finally embodied in the clauses of the claims which are appended to and which form an essential part of this specification.

The invention is clearly illustrated in the accompanying drawings, in which—

Figure 7:
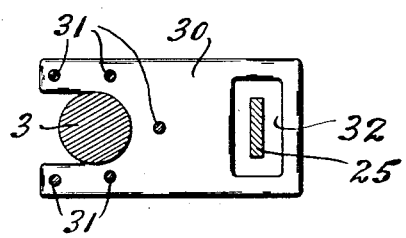

Figure 1 is a side elevation illustrating the inner side of a vehicle wheel equipped with the novel resilient tire and tread therefor, made according to and embodying the principles of my present invention; and Fig. 2 is a side elevation illustrating a portion of the outer side of the vehicle wheel equipped with said novel resilient tire and tread therefor. Fig. 3 is a detail cross section taken on line 3—3 in said Fig. 1; and Fig. 4 is another detail cross section taken on line 4—4 in said Fig. 1: both of said figures being viewed in the direction of the arrow *x*, and being drawn upon an enlarged scale. Fig. 5 is a detail longitudinal section taken on line 5—5 in said Fig. 3. Fig. 6 is a detail cross section similar to that shown in Fig. 3, but illustrating the pneumatic element removed from its operative association and connected relation with both said protecting tread and the rim of the vehicle wheel. Fig. 7 is a detail horizontal section taken on line 7—7 in said Fig. 3 looking downward.

Similar characters of reference are employed in all of the hereinabove described views, to indicate corresponding parts.

Referring now to the said drawings the reference character 1 indicates a complete vehicle wheel comprising a hub 2 from which radiate the spokes 3, and 4 indicates the felly which is supported at the outer ends of said spokes 3. Secured to said felly 4 is the fixed portion 5 of a clencher-rim, the attachable or removable portion of which is indicated by the reference numeral 6.

The reference character 7 indicates the outer casing or shoe of an ordinary pneumatic tire, the inner marginal edges of which are provided with the annular ribs or projections 8 adapted to be engaged by said clencher-rim members for securing the pneumatic tire to the felly of the vehicle wheel. The said felly 4 is provided with holding latches or lugs 9, which are turned across said detachable or removable portion 6 of said clencher-rim after the same has been properly adjusted to the said outer casing or shoe 7, thereby locking the same in holding relation to both the fixed portion 5 of said clencher-rim and said outer casing or shoe 7 of the pneumatic tire which is associated therewith. Arranged within said outer casing or shoe 7, in the usual manner, is a pneumatic inner tube 10, adapted to receive and hold air under pressure.

Secured upon the outer surface of said outer casing or shoe 7, by means of rivets 11, or any other suitable holding means, is a metallic band or ring 12, the same being of slightly smaller diameter than the extreme diameter of said outer casing or shoe 7, so that when air under pressure is introduced into the pneumatic tire, the said outer casing or shoe will be forced outwardly so as to tightly hug or embrace said band or ring 12, which will then appear to be slightly embedded in the outer surface of said outer casing or shoe 7. In order to prevent the fastening or holding rivets 11 from pulling out of or through said outer casing or shoe 7, the inner ends of the same are secured in anchor plates 13 which are registered upon the inner surface of said outer casing or shoe 7.

Secured upon said metallic band or ring 12, and spaced away from one another at suitable intervals, are a plurality of transversely extending yoke pieces 14. Said yoke-pieces are provided at one end with an outwardly extending lug or arm 15, the same being preferably arranged at right angles to the main body of said yoke-piece. Pivotally connected, by means of a suitable hinge-member 16, with the opposite end of said yoke-pieces 14 are lugs or arms 17, which may be disposed at right angles so as to project outwardly from the main-body of said yoke-piece, or the same may be turned downwardly so as to lie in the plane of said yoke-piece, for the purpose subsequently to be described. Each of said lugs or arms 15 and 17 of said yoke-pieces 14 are provided with suitably positioned holes or perforations 18, which are in alinement with each other when said respective lugs or arms are both in upright position.

The reference character 19 indicates an outer metallic tire or tread. This tire or tread may be equipped with a resilient surface material 20, made of rubber, leather, or any other desirable or suitable material, and attached to the outer surface of said tire or tread 19 in any suitable manner, but such resilient surface material is not essential to the proper function of the novel tire embodying the principles of my present invention, and the same may be omitted, so that the metallic tire or tread alone provides the traction surface, and in fact the latter condition is preferable for the vehicle wheels of heavy vehicles, such as trucks, omnibuses, delivery-wagons, and vehicles of similar character.

Fixed at the under or inner side of said metallic tire or tread 19, so as to form an integral part thereof or held in place by suitable fastening means, are pairs of parallel ribs or projections 21 spaced from each other at suitable intervals, or if so desired the same may be made continuous around the inner surface of said metallic tire or tread. Said parallel ribs or projections are provided with pairs of oppositely facing or registered openings 22, and the same are further provided with oppositely facing holes or perforations 23 placed in suitable locations. The free edges of said parallel ribs or projections 21 are further provided with oppositely facing rectangular cut-away portions 24, the same being located in line beneath said holes or perforations 23.

The reference characters 25 indicate a series of retaining elements, the upper or outer ends of which are preferably bifurcated to provide a pair of arms 26. Each of the arms 26 are turned or bent to provide forwardly projecting portions 27. The said forwardly projecting portions 27 are inserted through the said pairs of oppositely facing or registered openings 22, so as to extend transversely through said parallel ribs or projections 21 of said metallic tire or tread 19. When thus arranged a keeper-plate 28 is screwed, or otherwise secured, to the underside of each forwardly projecting portion 27, so that the same is interposed between said parallel ribs or projections 21, and thus retain said projecting portions 27 from withdrawal, and thereby properly connect said retaining elements 25 with said tire or tread 19. As thus arranged said retaining elements are disposed to extend radially toward the hub of the vehicle wheel. Said retaining elements are all connected together by means of a circular-member 29, to which said retaining elements are bolted.

While I have described and shown said retaining elements with the bifurcated portion providing two arms 26 and projecting portions 27, it must be understood that I do not limit myself to such an arrangement, since I may effectively use a single arm 26 and projecting portion 27 in place of two of the same to each retaining element 25.

The reference characters 30 indicate a series of guard-plates, each having a bifurcated end so that the same may straddle the spokes 3, and when thus arranged said guard-plates are secured to the inner side of said felly 4, by means of screws 31, or any other suitable fastening means, so that the free ends of said guard-plates project outwardly from said felly. The said free ends of the guard-plates are provided with hatches or openings 32 through which extend respectively the inner ends of said retaining elements 25.

When the pneumatic tire is mounted upon said clencher-rim, the outer casing or shoe 7 is positioned beneath said metallic tire or tread 19, and the yoke-pieces 14 extend through, or rather are embraced by said cutaway portions 24 of the longitudinal parallel ribs or projections 21, in such a manner that the lug or arm 15 extends outwardly across the outer surface of one of said ribs or projections 21, and the lug or arm 17 is turned outwardly so as to extend across the outer surface of the other rib or projection 21, and when so disposed the holes or perforations 18 of said respective lugs or arms 15 and 17 register with the holes or perforations 23 of said ribs or projections 21, thus permitting a bolt 33 to be passed therethrough, which when secured against removal by the nut 34 interlocks said yoke-members 14 with said metallic tire or tread 19, and thus providing means for securing said metallic tire or tread 19 to the outer surface of said outer casing or shoe 7 of said pneumatic tire.

The intervening spaces between said outer-casing or shoe 7 and said metallic tire or tread 19, not occupied by said parallel ribs or projections 21, may be filled with blocks of non-heat-conducting material 35, if desired, or the same may be left unfilled.

From the detailed description of the construction of my novel resilient tire, as above set forth, it will be apparent that the said metallic tire or tread 19, when thus interlocked upon the outer casing or shoe 7 of the pneumatic tire, will thoroughly protect the same against wear and tear, against liability to puncture, and against the evil effects of heat which is generated by the friction of direct traction of the pneumatic tire upon the ground, and at the same time, said metallic tire or tread 19 acquires from the backing or support of said pneumatic tire, which forms its foundation, a high degree of resiliency or elasticity not possible by the use of a metallic tire alone. Furthermore, the traction surface of said metallic tire or tread being less than that of the ordinary pneumatic tire, the friction consequent upon traction is greatly diminished, permitting higher rates of speed to be attained without danger to the tire. All of the above advantages serving to increase the practical life of the tire, and thereby make for cheapness and economy.

The purpose of said retaining elements 25 is, first, to render support to the metallic tire or tread 19 in case of deflation of the pneumatic element, in which case the weight of the vehicle will be supported by the engagement of said retaining elements 25 with the guard-plates 30, so that the whole weight of the vehicle does not come upon the flattened pneumatic tire. When this occurs the metallic tire or tread will move out of its concentric relation to the hub of the vehicle wheel, and will assume an eccentric relation thereto, and said retaining-member being all interconnected by said circular-member 29, therefore a plurality of said retaining-elements will move into engagement with the bounding edges of the hatches or openings 32 of said guard-plates 30, through which they pass, thus directly supporting said metallic tire or tread 19 from the spokes 3 of the vehicle wheel; second, said retaining elements 25 by engaging said guard-plates 30 will prevent undue lateral movement of said metallic tire or tread 19, due to the lateral drag upon the same when the vehicle makes turns at speed, or when any tendency to skid arises. Normally said retaining elements 25, do not contact with said guard-plates 30, since the said hatches or openings 32 of the latter are larger than the cross sectional area of said retaining elements, but upon any undue movement of the metallic tire or tread 19, in any direction, either vertical, lateral or longitudinal, a sufficient number of said retaining elements 25 are brought in contact with said guard-plates 30, to stop any such undue movement within a safe maximum limit, the size or dimensions of said hatches or openings 32 determining what such maximum limit will be.

While said retaining elements 25, and their coöperating parts, are shown upon one side and the inner side of the vehicle-wheel, it will be clearly understood that the same may be located on either or both sides of the vehicle wheel if desired, it not being my intention or desire to limit their position and disposition to that shown in the accompanying drawings.

In case of accident, whereby the pneumatic tire is injured, so that it will not retain air under pressure, or if worn out, the same may be removed from its connection with the felly and tire or tread 19, as follows:—The nuts 34 are removed from the bolts 33, and the latter are withdrawn, then the lugs or arms 17 are turned downward on their hinge connections 16, so that they lie in the plane of the main body of the yoke-pieces 14. Then the detachable portion 6 of the clencher-rim is removed. Now by drawing the outer-casing or shoe 7 off the clencher-rim laterally, the yoke-pieces 14 will slide through the cutaway portions 24 of the ribs or projections 21, drawing after them the turned down lugs or arms 17, thus permitting the pneumatic tire to be disconnected from the metallic tire or tread 19, all of which operations are indicated in Fig. 6 of the drawings. By reversing these operations, the repaired or new pneumatic tire or element may be again connected and interlocked with the metallic tire or tread 19.

Of course, it will be readily understood that many changes may be made in the above described construction of my invention and its detail parts, and many apparently widely different embodiments of my invention could be made without departing from the scope thereof, I intend, therefore, that all matter contained in the above description or shown in the accompanying drawings shall be interpreted as illustrative and not in a limiting sense, I also desire it to be understood that the language used in the following claims is intended to cover all generic and specific features of the invention herein described and all statements of the scope of the invention, which, as a matter of language, might be said to fall therebetween.

I claim—

1. The combination with the outer casing of a pneumatic tire of a metallic band affixed to the outer circumference thereof, transverse yoke-pieces secured to said band and provided at their ends with outwardly extending lugs, one of said lugs being rigidly and the other pivotally connected with said yoke-pieces, a metallic tread, means on the inner side of said tread adapted to be embraced by said yoke-pieces, and means for securing said yoke-pieces in such embracing relation.

2. The combination with the outer casing of a pneumatic tire of a metallic band affixed to the outer circumference thereof, transverse yoke-pieces secured to said band and provided at their ends with outwardly extending lugs, one of said lugs being rigidly and the other pivotally connected with said yoke-pieces, a metallic tread, means on the inner side of said tread adapted to be embraced by said yoke-pieces, means for securing said yoke-pieces in such embracing relation, retaining-elements connected with said metallic tread, and guard plates secured to said vehicle wheel with which said retaining elements coöperate.

3. The combination with the outer casing of a pneumatic tire of a metallic band affixed to the outer circumference thereof, transverse yoke-pieces secured to said band and provided at their ends with outwardly extending perforated lugs, one of said lugs being rigidly and the other pivotally connected with said yoke-pieces, a metallic tread, longitudinal ribs connected with the inner side of said metallic tread having perforations adapted to register with the perforations of said lugs of the yoke-pieces and a cutaway portion for embracing said yoke-pieces, a bolt adapted to be passed through the perforations of said lugs and said ribs, and a nut adapted to be secured upon said bolt to prevent its withdrawal.

4. The combination with the outer casing of a pneumatic tire of a metallic band affixed to the outer circumference thereof, transverse yoke-pieces secured to said band and provided at their ends with outwardly extending perforated lugs, one of said lugs being rigidly and the other pivotally connected with said yoke-pieces, a metallic tread, longitudinal ribs connected with the inner side of said metallic tread having perforations adapted to register with the perforations of said lugs of the yoke-pieces and a cutaway portion for embracing said yoke-pieces, a bolt adapted to be passed through the perforations of said lugs and said ribs, a nut adapted to be secured upon said bolt to prevent its withdrawal, retaining-elements connected with said metallic tread, and guard plates secured to said vehicle wheel with which said retaining elements coöperate.

5. The combination with the outer casing of a pneumatic tire of a metallic band affixed to the outer circumference thereof, transverse yoke-pieces secured to said band and provided at their ends with outwardly extending perforated lugs, one of said lugs being rigidly and the other pivotally connected with said yoke-pieces, a metallic tread, longitudinal ribs connected with the inner side of said metallic tread having perforations adapted to register with the perforations of said lugs of the yoke-pieces and a cutaway portion for embracing said yoke-pieces, a bolt adapted to be passed through the perforations of said lugs and said ribs, a nut adapted to be secured upon said bolt to prevent its withdrawal, a plurality of exteriorly disposed retaining elements, a circular-member for interconnecting said retaining-elements, each retaining element having a forwardly projecting portion, said ribs of said metallic tread having a transverse opening in which said projecting portion is received, means for securing said projecting portion against withdrawal from said opening, a plurality of guard-plates adapted to be secured to a vehicle wheel, and said guard-plates having hatches through which the free ends of said retaining elements pass, said hatches being of a size to permit a limited lateral movement of said retaining-element in any direction.

6. In a device of the kind described, a pneumatic tire comprising an outer-casing and an inner tube, means for mounting said pneumatic tire upon a vehicle wheel, a metallic band affixed to the outer-circumference of said outer-casing, transverse yoke-pieces secured to said band and provided at their ends with outwardly extending lugs, one of said lugs being rigidly and the other pivotally connected with said yoke-pieces, a metallic tread provided upon its outer surface with a facing of resilient material, means on the inner side of said tread adapted to be embraced by said yoke-pieces, and means for securing said yoke-pieces in such embracing relation.

7. In a device of the kind described, a pneumatic tire comprising an outer-casing and an inner tube, means for mounting said pneumatic tire upon a vehicle wheel, a metallic band affixed to the outer-circumference of said outer-casing, transverse yoke-pieces secured to said band and provided at their ends with outwardly extending lugs, one of said lugs being rigidly and the other pivotally connected with said yoke-pieces, a metallic tread provided upon its outer surface with a facing of resilient material, means on the inner side of said tread adapted to be embraced by said yoke-pieces, means for securing said yoke-pieces in such embracing relation, retaining-elements connected with said metallic tread, and guard plates secured to said vehicle wheel with which said retaining elements coöperate.

In testimony, that I claim the invention set forth above I have hereunto set my hand this 29th day of November, 1913.

GIROLAMO CONCATO.

Witnesses:
 FRED. J. COX,
 K. J. BERNER.